United States Patent

[11] 3,630,702

| [72] | Inventor | Jack Lawrenson<br>St. Helens, England |
| --- | --- | --- |
| [21] | Appl. No. | 786,722 |
| [22] | Filed | Dec. 24, 1968 |
| [45] | Patented | Dec. 28, 1971 |
| [73] | Assignee | Pilkington Brothers Limited<br>Liverpool, England |
| [32] | Priority | Dec. 29, 1967 |
| [33] | | Great Britain |
| [31] | | 59,147/67 |

[54] FLOAT GLASS METHOD AND APPARATUS FOR SUPPLYING MODIFYING MATERIAL TO THE GLASS SURFACE
9 Claims, 4 Drawing Figs.

[52] U.S. Cl. ................................................... 65/30,
65/60, 65/99 A, 65/182 R
[51] Int. Cl. ......................................................... C03b 18/00

[50] Field of Search............................................ 65/99, 182,
30, 60

[56] References Cited
UNITED STATES PATENTS

| 3,351,447 | 11/1967 | Lawrenson.................. | 65/182 X |
| --- | --- | --- | --- |
| 3,467,508 | 9/1969 | Loukes et al. ................ | 65/99 X |
| 3,472,641 | 10/1969 | Gray............................. | 65/182 X |

*Primary Examiner*—S. Leon Bashore
*Assistant Examiner*—J. B. Hardaway
*Attorney*—Morrison, Kennedy & Campbell ABSTRACT: Float glass having a desired characteristic is made by maintaining a body of molten material which modifies the glass in contact with a surface of the glass to produce the characteristic while there is relative movement between the glass and the body, and supplying said material onto the glass surface upstream of the body so that the body is replenished in the course of the relative movement.

PATENTED DEC 28 1971

3,630,702

Inventor
Jack Lawrenson
By
Morrison, Kennedy & Campbell
Attorneys

FLOAT GLASS METHOD AND APPARATUS FOR SUPPLYING MODIFYING MATERIAL TO THE GLASS SURFACE

BACKGROUND OF THE INVENTION

This invention relates to the manufacture of glass having predetermined surface characteristics.

It has been proposed to manufacture flat glass having desired surface characteristics by maintaining a body of molten material which modifies the glass in contact with the upper surface of a ribbon of glass being advanced in a horizontal plane.

The surface of the glass is modified by causing controlled migration of an element from the molten material into the surface of the glass and this controlled modification of the surface of the glass may be effected by controlling the oxidation conditions at the interface between the molten material and the glass or by passing controlled electric current between the body of molten material and the glass.

As this migration proceeds, it is necessary to replenish the molten material in the body, and it is a main object of the present invention to provide an improved method and apparatus for replenishing the body of molten material.

SUMMARY

According to the invention a method of manufacturing glass having desired characteristics other than those inherent in the method of forming the glass, comprises maintaining a body of molten material which modifies the glass to produce a desired characteristic in contact with a surface of the glass which is at a temperature above the melting point of said material, moving the glass and said body relatively so as to renew continuously the surface in contact with said body, and supplying said material onto the surface of the glass upstream of said body so that said replenishing material is incorporated into and replenishes said body in the course of said relative movement.

The invention also includes a method of manufacturing flat glass having desired surface characteristics, comprising maintaining a body of molten material which modifies the glass in contact with the upper surface of a ribbon of glass being advanced in a horizontal plane, and which is at a temperature above the melting point of said material, and feeding a pellet of replenishing material onto the ribbon surface upstream of said body so that the pellet melts on the ribbon surface as it is advanced to said body for incorporation therein.

Preferably according to the invention, a method of manufacturing flat glass having desired surface characteristics comprises maintaining a body of molten material which modifies the glass in contact with the upper surface of a ribbon of glass being advanced in a horizontal plane, and which is at a temperature above the melting point of said material, and holding a pellet of replenishing material on the ribbon surface upstream of said body until the pellet melts on to the ribbon surface and thereby releases itself for forward movement on the ribbon and into said body.

The replenishing material which is thus moved forwardly on the surface of the ribbon of glass into the body of molten material is generally the material which is being caused to migrate from the body of molten material into the surface of the advancing ribbon of glass and the configuration of the body of molten material is thereby maintained.

It has been found that replenishment of the body of molten material may be necessary at a selected location or region of the molten body particularly in the circumstance that a wide ribbon of glass is being treated by the method of the invention, for example a ribbon of glass 2.5 meters wide.

In order to replenish the body of molten material at a selected location the invention includes holding the pellet at a selected position transversely of the ribbon of glass corresponding to a part of the body of molten material to be replenished.

In the application of the invention to the float process for the manufacture of flat glass during which glass in ribbon form is advanced along a bath of molten metal it has been found advantageous to maintain the body of molten material against the upper surface of the glass by causing that molten body to cling to a locating member adjacent the upper surface of the glass and the improved method according to the invention provides an effective way of replenishing a body of molten material which is so maintained against the upper surface of the advancing ribbon of glass.

The invention also comprehends apparatus for use in the manufacture of flat glass having desired surface characteristics comprising a support for an advancing ribbon of glass, heaters associated with the support for thermally conditioning the advancing glass, locating means mounted transversely of the support so as to be just above the path of travel of the upper surface of the advancing ribbon of glass, means for supplying molten material to a body of molten material held by said locating means on the glass surface said supplying means including a replenishing duct terminating just above the path of travel of the upper surface of the ribbon upstream of said locating means, and means for feeding replenishing material through said duct and on to the said upper surface, so that said material melts at the ribbon surface and is incorporated in said body as the ribbon advances.

Preferably the end of the replenishing duct is shaped so as to feed a pellet of replenishing material on to the ribbon surface upstream of said body so that the pellet melts on to the ribbon surface as the ribbon advances.

In one embodiment of the invention the end of the duct is shaped so as to hold a pellet of a replenishing material against the ribbon surface until the pellet melts onto the ribbon and thereby releases itself from the duct.

In the application of the invention to the float process the support for the ribbon of glass is an elongated bath of molten metal contained in a tank structure and the replenishing duct passes through a sidewall of the tank structure and is mounted in that sidewall by means for selectively positioning the end of the duct transversely of the path of travel of the ribbon of glass.

Preferably the bath of molten metal is so constituted as to have all the characteristics fully described in U.S. Pat. No. 2,911,759 and 3,083,551. For example the bath of molten metal is a bath of molten tin or an alloy of tin in which tin predominates, and is contained in an elongated tank structure over which a roof structure defines a headspace in which a protective atmosphere is maintained as a plenum.

The locating means is preferably a bar-shaped member mounted transversely of and just above the path of travel of the upper surface of the ribbon of glass. The body of molten material clings to the bar-shaped member which may in some circumstances act as an anode, being connected in an electric circuit so that electric current is passed between the body of molten material and the glass to cause controlled migration of an element into the surface of the glass.

In a preferred embodiment of the invention the replenishing duct is a stainless steel tube terminating in a head with an underneath mouth, which tube is held so that the mouth is spaced from the path of travel of the upper surface of the glass by a distance less than the diameter of the pellets of replenishing material to be fed down the tube.

DESCRIPTION OF THE PREFERRED EMBODIMENTS

Figure 1:
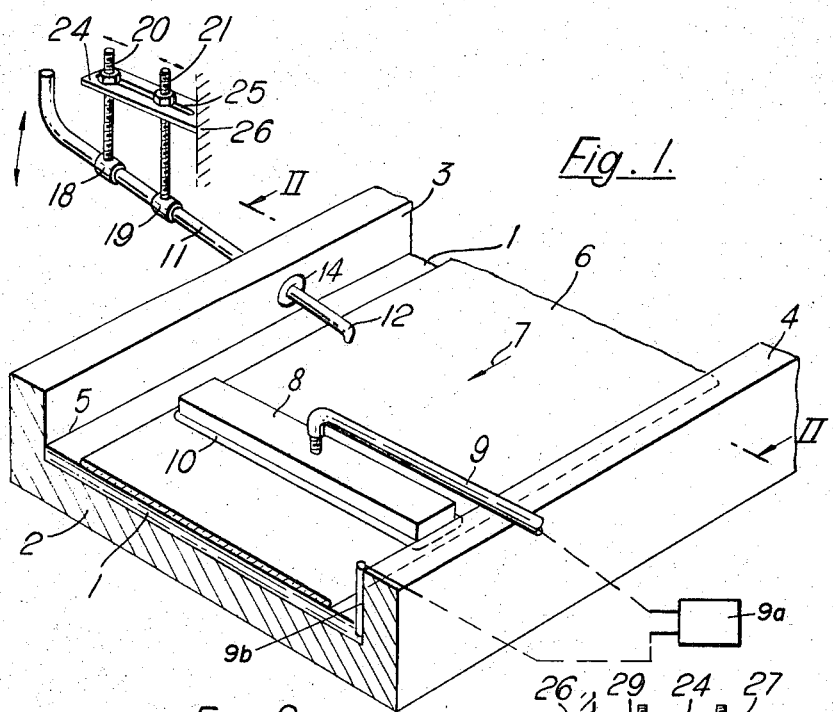
FIG. 1 is a perspective view of a part of a tank structure for use in the manufacture of flat glass, and incorporating apparatus according to one embodiment of the invention, showing the location of a bar-shaped member mounted transversely of and just above the path of travel of a ribbon of glass and the positioning of a replenishing duct for feeding pellets of replenishing material onto the surface of the advancing ribbon.
Figure 2:
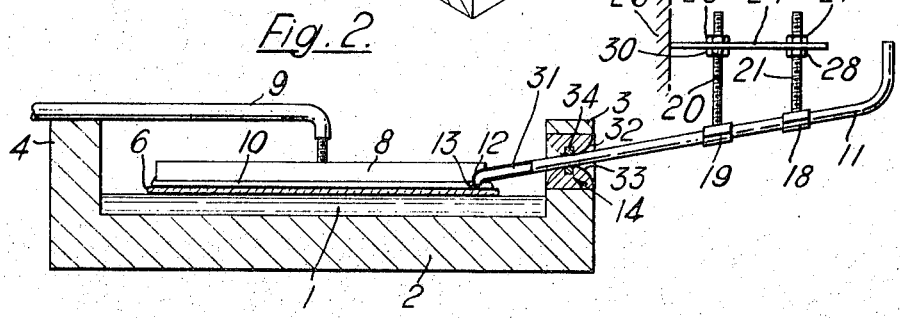
FIG. 2 is a cross section in the plane of line II—II of FIG. 1.

Referring to FIGS. 1 and 2 of the drawings a tank structure containing a bath of molten metal 1 comprises a floor 2 and integral sidewalls 3 and 4. The bath 1 whose surface level is indicated at 5 is preferably a bath of molten tin or of a tin alloy in which tin predominates.

A roof structure, omitted for the sake of clarity, is mounted over the tank structure and confines a tunnellike headspace over the bath 1 in which a protective atmosphere is maintained as a plenum. Glass, for example soda-lime-silica glass, is fed to the bath of molten metal at a controlled rate either as a preformed ribbon of glass which undergoes a surface treatment during its advance along the bath, or as molten glass which is poured onto the bath of molten metal at a controlled rate and is permitted to flow laterally unhindered to the limit of its free flow in order to develop a buoyant body of molten glass which is advanced in ribbon form along the bath surface. The direction of advance of the ribbon of glass on the bath is indicated by the arrow 7 in FIG. 1. The temperature of the ribbon of glass is regulated as it is advanced by thermal regulators immersed in the bath 1 and mounted in the headspace over the bath, but which are omitted from the drawings of the present application for the sake of clarity.

In order to impart desired surface characteristics to the upper face of the ribbon of glass a body of molten material is maintained against the upper surface of the glass. A bar-shaped locating member 8 is mounted on a support rod 9 just above the upper surface of the glass so that a gap for example of about 7 mm. is maintained between the bottom of the bar and the path of travel of the upper surface of the ribbon of glass.

A body of molten material 10 clings to the lower face of the member 8 and is suspended from that lower surface in contact with the upper surface of the ribbon of glass. The body 10 is confined between the lower surface of the member 8 and the upper surface of the ribbon. The clinging of the body 10 of molten material to the member 8 at least partly relieves the weight of the body of molten material acting on the upper surface of the advancing ribbon and the member 8 acts as a locating means which ensures the location of the body 10 relative to the glass and prevents forward movement of the molten body with the glass.

The molten material constituting the body 10 may be a molten metal or a molten alloy. For example the metal may be tin, lead, bismuth, antimony, indium, zinc or thallium. If the molten body 10 is an alloy it may be an alloy of tin or lead or bismuth as solvent metal with a solute metal for example lithium, sodium, potassium, zinc or magnesium. The member 8 is preferably of an unreactive metal, for example one of the platinum group metals. Alternatively the member 8 may comprise a base for example of copper, brass or steel or even a refractory material, which is provided with a coating of an unreactive metal, for example a ruthenium coating.

As the ribbon of glass passes continuously beneath the body of molten material its surface is modified by an element from the body 10 and this migration of an element into the glass surface can be controlled by passing an electric current between the body 10 and the glass by connecting the member 8 in an electric supply circuit 9a so as to act as an anode in an arrangement for electrolytic treatment of the upper surface of the ribbon of glass. The circuit 9a is also connected to an electrode 9b dipping into the bath as set forth in U.S. Pat. No. 3,467,508.

Alternatively oxidizing conditions in the body 10 of molten material may be controlled so as to control the migration of an element from the body into the glass surface.

There is a need to replenish the body 10 of molten material with the element which is entering the upper surface of the glass ribbon 6 and the method of the invention provides a convenient way of replenishing that body which has the additional advantage of enabling the body to be replenished selectively at any point transversely of the body.

A replenishing duct in the form of a stainless steel tube 11 passes through one sidewall 3 of the tank structure. The tube 11 terminates in a head 12 with an underneath mouth 13, which tube 11 is held in a mounting 14 in the sidewall 3 of the tank structure. The portion of the tube 11 outside the tank wall is supported in adjustable clamps 18, 19 mounted on vertical screw-threaded rods 20, 21 passing through a slot 25 in a horizontal bracket 24 fixed at 26 with respect to the tank wall 3, the slot 25 extending in a direction transversely of the tank. The rods 20, 21 each have upper and lower nuts 27, 28, 29, 30 threaded thereon for tightening on the rods to clamp them to the bracket 24. It will thus be seen that the rods 20, 21 may be adjusted longitudinally of the slot 25, thereby adjusting the position of the tube 11 and hence the mouth 13 thereof transversely of the tank. The tube 11 is preferably slightly inclined to the horizontal. By adjusting the nuts 27, 28, 29, 30, the inclination of the tube 11 and the longitudinal position of the rods 20, 21 in the slot 25 can be varied so that the height of the mouth 13 above the ribbon of glass 6, as well as the transverse position of the mouth 13 in the tank can be adjusted for a purpose to be explained.

The transverse adjustment of the tube 11 and the adjustment of the height of the mouth 13 above the glass ribbon will necessitate some angular movement of the tube 11 about a horizontal axis in the mounting 14. To prevent the ingress of air and the escape of the protective atmosphere, while permitting such movement of the tube 11, the mounting 14 has an aperture therethrough with a throat 31 defined between surfaces 32, 33 which diverge towards the faces of the wall 3. A sealing gland 34 is provided as shown, preferably in the throat 31.

Figure 3:
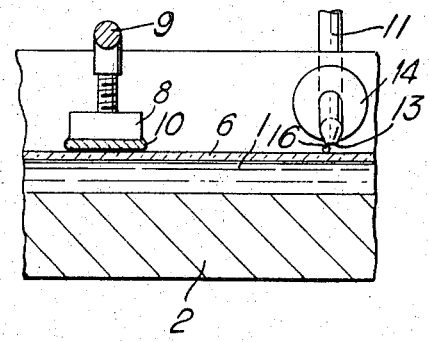
FIG. 3 is a partial longitudinal section through the apparatus of FIGS. 1 and 2 showing a pellet of replenishing material held in position by the rim of the mouth of the replenishing duct.

Desirably, the mouth 13 is spaced from the path of travel of the upper surface of the ribbon of glass 6 by a distance of from example 3 to 5 mm. Pellets of the replenishing material are fed individually down the stainless steel tube 11 the diameter of the pellets being greater than the spacing of the rim of the mouth 13 above the upper surface of the ribbon of glass 6 so that each pellet, one of which is indicated at 16 in FIG. 3, is held against the ribbon surface as the ribbon of glass 6 advances beneath the pellet. Usually the pellet is in the form of a ball which rolls initially on the hot glass surface. The ribbon is hotter than the melting point of the replenishing material so that the pellet 16 gradually melts. In one example of the operation of the invention the body of molten material 10 is a body of molten lead and lead pellets are fed down the tube 11 to replenish the body. The location of one lead pellet 16 being held in position by the rim of the mouth 13 of the replenishing duct is illustrated in FIG. 3.

Figure 4:
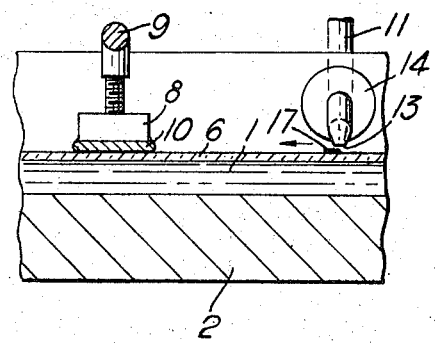
FIG. 4 illustrates a melted pellet which has released itself from the mouth of the duct and is being advanced towards the body of molten material maintained on the surface of a glass ribbon.

FIG. 4 shows how the pellet melts due to the heat of the ribbon of glass 6 and the environment in which the pellet is held by the mouth 13. The molten material of the pellet falls onto the ribbon surface as indicated at 17 and thereby releases itself from the hold of the mouth 13 and moves forwardly on the ribbon 6 into the body of molten material 10 at the transverse position selected by the positioning of the head 12 of the replenishing duct transversely of the path of travel of the ribbon of glass 6.

At the point where the pellet 16 in the mouth 13 drops onto the ribbon of glass 6, the weight of the pellet on the molten glass ribbon might cause distortion of the molten glass surface, so that it is desirable to locate the mouth close to or in the longitudinal marginal portion of the glass ribbon, which marginal portion may be cut from the ribbon.

During the forward movement of the molten replenishing material on the ribbon 6 it is exposed to the atmosphere over the bath of molten metal and is in contact with the advancing ribbon of glass 6, so that it has achieved chemical equilibrium with its environment before it enters the body of molten material 10. Consequently the replenishing material blends immediately with the molten material of the body without detriment to the surface treatment of that region of the glass which the pellet contacts.

The flat horizontal surface of the ribbon of glass 6 supported on the bath of molten metal during its advance ensures that there is no transverse movement of the "drop" of molten replenishing material as it is advanced on the ribbon surface towards the body of molten material 10.

The pellet 16 fed down the replenishing duct may be a pellet of pure metal or may be a pellet of an alloy, or of a salt which melts on the upper surface of the ribbon and replenishes a body of molten salt maintained against the ribbon surface by the member 8 in order to modify the surface of the ribbon of glass 6.

The invention thus provides an auxiliary control of the treatment of the surface of an advancing ribbon of glass, in particular in the surface treatment of a ribbon of glass being manufactured by the float process, by providing an improved method of replenishing the body of molten material at selective locations transversely of that body thereby providing improved control of the configuration of the contact area of the body of molten material with the upper surface of the ribbon of glass being treated.

We claim:

1. A method of manufacturing float glass having desired characteristics comprising maintaining in contact with the upper surface of the floating glass a body of molten material which modifies the glass by controlled migration of an element from that body into the glass, the glass being at a temperature above the melting point of said material, moving the glass relatively relatively to said body, migrating an element from said body into the upper glass surface, and holding a pellet of replenishing material on the glass surface upstream of said body until the pellet melts onto the glass surface and thereby releases itself for forward movement on the glass and into said body.

2. A method according to claim 1, including holding the pellet at a selected position transversely of the ribbon of glass corresponding to a part of the body of molten material to be replenished.

3. A method according to claim 1, wherein the body of molten material is maintained against the upper surface of the advancing ribbon of glass by causing said body to cling to a locating member adjacent the upper surface of the glass.

4. Apparatus for use in the manufacture of float glass having desired surface characteristics, comprising a molten metal support for an advancing ribbon of glass, means for maintaining a protective atmosphere over the support, heaters associated with the support for thermally conditioning the advancing glass, a locating member mounted transversely of the support and just above the path of travel of the upper surface of the advancing ribbon of glass, means for supplying molten material to a body of molten material which clings to said locating member on the glass surface, and means for controlling ionic migration from said body of molten material into the upper surface of the ribbon of glass, said supplying means including a replenishing duct terminating just above the path of travel of the upper surface of the ribbon upstream of said locating member, and through which replenishing material is fed onto the said upper surface, so that said material melts at the ribbon surface and is incorporated in said body as the ribbon advances.

5. Apparatus according to claim 4, wherein the end of the replenishing duct is shaped so as to feed a pellet of replenishing material onto the ribbon surface upstream of said body so that the pellet melts onto the ribbon surface as the ribbon advances.

6. Apparatus according to claim 5, wherein the end of the replenishing duct is spaced from said ribbon so as to hold a pellet of a replenishing material against the ribbon surface until the pellet melts onto the ribbon and thereby releases itself from the duct.

7. Apparatus according to claim 4, wherein the support for the ribbon of glass is an elongated bath of molten metal contained in a tank structure, and the replenishing duct passes through a sidewall of the tank structure and is mounted in that sidewall by means for selectively positioning the end of the duct transversely of the path of travel of the ribbon of glass.

9. Apparatus according to claim 4, wherein said locating member is a bar-shaped member mounted transversely of and just above the path of travel of the upper surface of the ribbon of glass.

9. Apparatus according to claim 5, wherein the replenishing duct is a stainless steel tube terminating in a head with an underneath mouth, which tube is held so that the mouth is spaced from the path of travel of the upper surface of the glass by a distance less than the diameter of the pellets of replenishing material to be fed down the tube.

* * * * *